United States Patent
Janzen, Jr. et al.

(10) Patent No.: US 10,212,929 B2
(45) Date of Patent: Feb. 26, 2019

(54) REMOTE CONTROLLED BATTERY POWERED DUCK DECOY

(71) Applicant: XXTREME WATERFOWL R/C LLC, Beggs, OK (US)

(72) Inventors: James H. Janzen, Jr., Beggs, OK (US); Brennon L. Fredericksen, Beggs, OK (US)

(73) Assignee: XXTREME WATERFOWL R/C LLC, Beggs, OK (US)

( * ) Notice: Subject to any disclaimer, the term of this patent is extended or adjusted under 35 U.S.C. 154(b) by 250 days.

(21) Appl. No.: 14/997,166

(22) Filed: Jan. 15, 2016

(65) Prior Publication Data
US 2016/0205921 A1    Jul. 21, 2016

(51) Int. Cl.
*A01M 31/06* (2006.01)
*H04N 1/00* (2006.01)
*H04N 5/225* (2006.01)

(52) U.S. Cl.
CPC ........ *A01M 31/06* (2013.01); *H04N 1/00095* (2013.01); *H04N 5/2257* (2013.01)

(58) Field of Classification Search
CPC .................................................. A01M 31/06
USPC .......................................... 43/2, 3; 446/154
See application file for complete search history.

(56) References Cited

U.S. PATENT DOCUMENTS

| | | | |
|---|---|---|---|
| 1,962,188 A * | 6/1934 | Freeman | A01M 31/06 119/792 |
| 2,443,040 A * | 6/1948 | Jones | A01M 31/06 43/3 |
| 3,074,195 A | 1/1963 | Vanderpool | |
| 3,399,408 A * | 9/1968 | Bailey | 441/65 |
| 3,689,927 A | 9/1972 | Boston | |
| 4,141,167 A * | 2/1979 | Muehl | A01M 31/06 43/2 |
| 4,270,307 A * | 6/1981 | Arigaya | A63H 30/04 440/49 |
| 4,314,423 A * | 2/1982 | Lipsitz | A63H 13/00 340/384.3 |
| 4,322,908 A | 4/1982 | McCrory | |
| 5,203,729 A * | 4/1993 | Beller | B60F 3/0023 440/113 |
| 5,377,439 A | 1/1995 | Roos et al. | |
| 5,385,501 A * | 1/1995 | Fish | A63H 23/14 446/154 |
| 5,453,035 A * | 9/1995 | Jenkins | A63H 23/04 440/4 |
| 5,581,932 A * | 12/1996 | Bell | A01K 91/02 43/26.1 |
| 5,636,466 A * | 6/1997 | Davis | A01M 31/06 43/3 |

(Continued)

OTHER PUBLICATIONS

Product page for Retrieval Decoy 2.4 RTR, available at http://www.proboatmodels.com. Publication date unknown but admitted as prior art.

(Continued)

*Primary Examiner* — Magdalena Topolski
(74) *Attorney, Agent, or Firm* — David G. Woodral; GableGotwals

(57) ABSTRACT

A remote control decoy having a hollow shell in the shape and appearance, when viewed above a waterline, of a waterfowl. A boat-like hull with an open top and blunted front end is affixed to an underside of the hollow shell such that the boat-like hull rides below the waterline.

8 Claims, 9 Drawing Sheets

(56) References Cited

U.S. PATENT DOCUMENTS

| | | | |
|---|---|---|---|
| 5,806,232 A * | 9/1998 | James | A01K 97/02 43/26.1 |
| 6,463,690 B1 | 10/2002 | Wood et al. | |
| 6,553,709 B1 * | 4/2003 | Owen | A01M 31/06 43/3 |
| 6,601,333 B2 | 8/2003 | Cicoff et al. | |
| 7,975,421 B2 | 7/2011 | Ware et al. | |
| 8,266,836 B2 | 9/2012 | Ware et al. | |
| 8,276,308 B1 | 10/2012 | Jones et al. | |
| 2004/0025770 A1 | 2/2004 | Saunoris et al. | |
| 2007/0006516 A1 * | 1/2007 | LaCroix, Jr. | A01M 31/00 43/26.1 |
| 2009/0165356 A1 * | 7/2009 | Blum | A01K 91/02 43/26.1 |
| 2009/0188148 A1 | 7/2009 | Orris et al. | |
| 2011/0067289 A1 | 3/2011 | Lane | |
| 2011/0113672 A1 * | 5/2011 | Holmberg | A01M 31/06 43/2 |
| 2015/0059228 A1 * | 3/2015 | Holmes | A01M 31/06 43/3 |
| 2016/0100569 A1 * | 4/2016 | Hudson | A01M 31/06 43/3 |
| 2016/0174541 A1 * | 6/2016 | Goodman | A01M 31/06 43/3 |
| 2016/0174542 A1 * | 6/2016 | Burton | A01M 31/06 43/3 |
| 2017/0049095 A1 * | 2/2017 | Hanson | A01M 31/06 |
| 2017/0295775 A1 * | 10/2017 | Smith | A01M 31/06 |

OTHER PUBLICATIONS

Product page for Swim'N Duck Remote Control Decoys—Mallard Drake Bass Pro Shops, available at http://www.basspro.com. Publication date unknown but admitted as prior art.

Product page for Ultimate Hunter Swim'n Duck Remote Control Decoy, available at http://www.tightlinesuv.com. Publication date unknown but admitted as prior art.

* cited by examiner

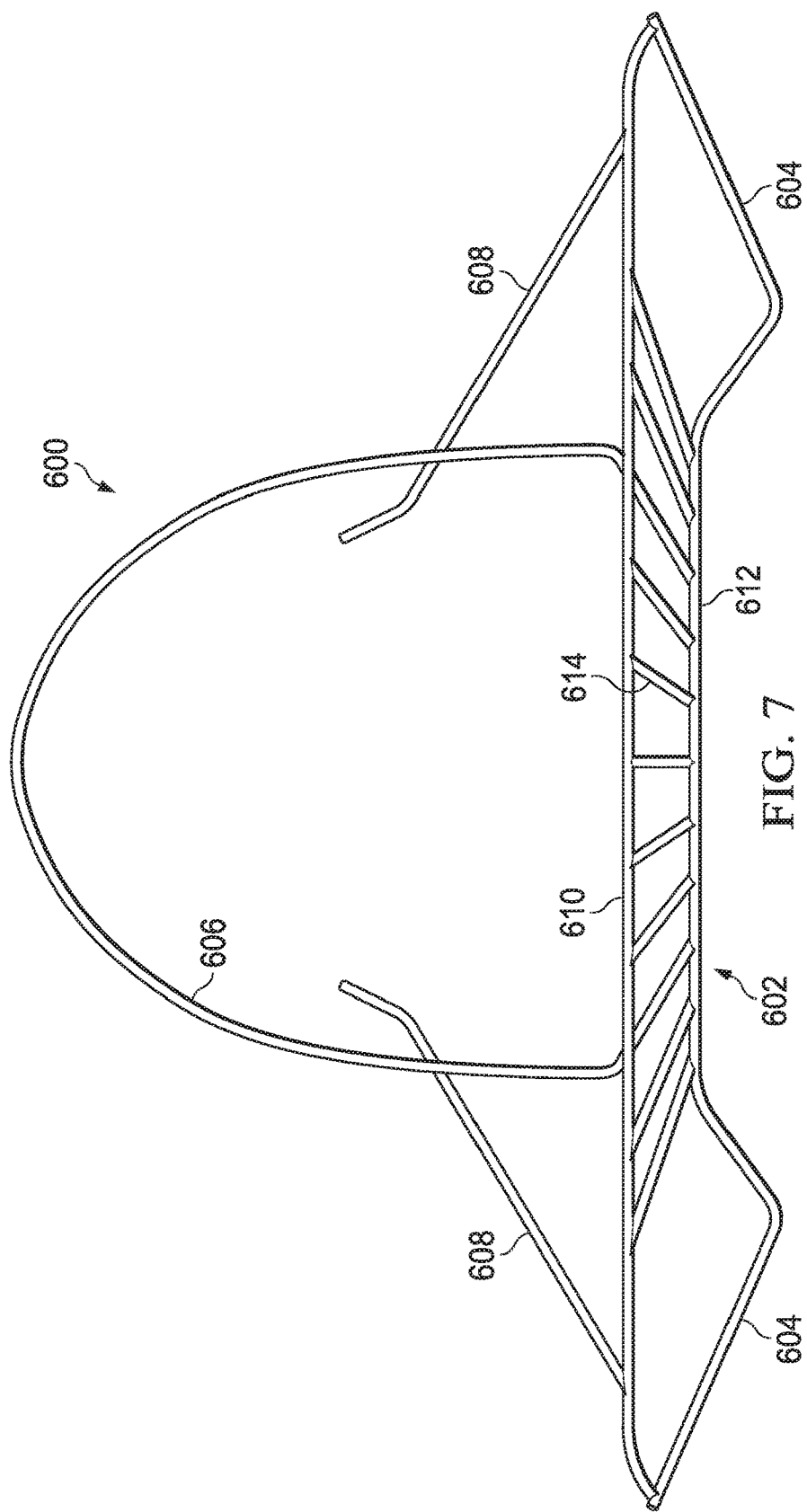

REMOTE CONTROLLED BATTERY POWERED DUCK DECOY

CROSS-REFERENCE TO RELATED CASES

This application claims the benefit of U.S. provisional patent application Ser. No. 62/103,801, filed on Jan. 15, 2015, and incorporates such provisional application by reference into this disclosure as if fully set out at this point.

FIELD OF THE INVENTION

The present invention relates generally to the field of hunting decoys and, more specifically, to an enhanced waterfowl decoy.

BACKGROUND OF THE INVENTION

Historically, duck decoys have been static models that float freely on the surface of the water. They may also be anchored or moored in cases where wind or currents are expected. Ducks or other waterfowl may observe the decoys from the air and therefore be more likely to land, or come within range of a hunter. To an extent, ducks are capable of learning to discern decoys, at least within close range. It has long been known that the static appearance of the decoys is important. In other words, the more like a real duck the decoy appears, the more difficult it will be for a bird to determine the decoy is not real, which would make it far less likely that the bird will come within range.

In order to further increase realism various electronic decoys have been developed. For example, decoys have been developed that sit slightly above the surface of the water (or at least in a flight posture) with motorized wings that attempt to mimic a duck taking off or landing. The rationale has been that movement makes the decoy appear more realistic than a static pose. However, once such a decoy has been encountered one or more times, a bird will become far less likely to be fooled simply by the spinning wings. Further, at close range, most such active decoys do not appear particularly realistic.

What is needed is a system and method for addressing the above, and related, issues.

SUMMARY OF THE INVENTION

The invention of the present disclosure, one aspect thereof, comprises a remote control decoy having a hollow shell in the shape and appearance, when viewed above a waterline, of a waterfowl. A boat-like hull with an open top and blunted front end is affixed to an underside of the hollow shell such that the boat-like hull rides below the waterline when the shell is placed on a water surface and the hollow shell and boat-like hull form a contiguous hollow interior. An electric motor is affixed to a shaft passing from inside the hollow interior to a propeller outside the hollow interior and situated rearward of the boat-like hull and below the hollow shell. A servo inside the hollow interior is affixed via a control rod to a steering rudder situated rearward of the boat-like hull and below the hollow shell. A battery pack inside the hollow interior is coupled to the electric motor and servo to provide power. A transceiver is configured to receive radio control signals and activate the electric motor and servo for providing movement and steering of the decoy.

The decoy may include a remote control selectively providing radio control signals to the transceiver. The radio control signals include may at least signals to the transceiver to activate or stop the motor and steer the rudder left and right.

The decoy may further include at least one metallic weight affixed to the hollow shell inside the hollow interior to decrease a height at which the decoy rides on the water to create a more realistic wake when the decoy moves.

An eyelet may be affixed at a rear of the hollow shell for towing additional unpowered decoys. A plurality of additional unpowered decoys may be towed using the eyelet. At least one of the plurality of additional unpowered decoys has a rudder that rides below the waterline, the rudder having at least a portion thereof that is angled with respect to a front to rear direction of the decoy so as to cause a leftward or rightward drift of the decoy when the decoy is pulled. In some embodiments, at least one of the plurality of additional unpowered decoys has a rudder angled to cause a rightward drift, and at least one of the plurality of additional unpowered decoys has a rudder angled to cause a leftward drift.

In some embodiments, a camera is placed inside the hollow interior pointed through a portal on a front portion of the hollow shell. The camera may transmit images to a remote viewing device.

Some embodiments of the decoy include a pusher grille mounted to the shell. The pusher grille has a grate section extending downwardly into the water surface. The grate section of the pusher grille may comprises a plurality of upright members fixed between upper and lower cross members. A neck loop may extends rearwardly from the upper cross member to encircle a neck portion of the shell and a pair of side braces may extend from the upper cross member rearwardly and downwardly astride the shell toward the hull.

The invention of the present disclosure, in another aspect thereof, comprises a remote controlled decoy system including a powered decoy comprising with a shell having an appearance of a waterfowl on an upper portion thereof and a substantially flat lower portion, a hull with a blunted front end proceeding downward from the flat lower portion of the shell and sealed to the shell to form a contiguous hollow interior of the decoy, an electric motor inside the hollow interior powering a propeller behind the hull, a servo inside the hollow interior controlling an angle of a rudder behind the hull, a power supply inside the hollow interior powering the electric motor and the servo, and a remote control transceiver and control unit that receives remote control commands to activate the electric motor and servo. The system includes at least one towed decoy affixed to the powered decoy via a flexible line to be towed behind the powered decoy. The powered decoy rides low enough in a body of water when under power such that the hull remains completely below a waterline of the body of water and the blunted end is positioned far enough forward with respect to the shell so as to aid in producing a wake resembling a wake produced by a live duck. The system may include at least one towed decoy having a directional rudder below the waterline that urges the decoy away from a straight line when pulled. The decoy system may include a pusher grille affixed to the shell and with a downwardly extending grate for moving downed game.

The invention of the present disclosure, in another aspect thereof, comprises a method including affixing a boat-like hull with a blunted front end to the bottom of a shell having an appearance resembling a waterfowl to form a contiguous hollow interior, the shell having a larger surface area than a top of the boat-like hull such that the shell overhangs the boat-like hull in a front and back and both sides. The method includes providing a propeller behind the hull and below the shell, providing a steering rudder behind the propeller and below the shell, providing a power supply in the hollow interior, controlling power from the power supply to a motor to selectively power the propeller, controlling power from the power supply to selectively power a servo for steering the shell via the rudder, and receiving control commands to selectively power the motor and servo with a remote transceiver within the hollow interior operatively coupled to the power supply, motor, and servo.

In some embodiments, the method includes wirelessly providing control commands to the transceiver from a remote control transmitter. The method may include wirelessly receiving data from a camera affixed to the shell. Weights may be provided within the hollow interior to ensure the shell rides at a realistic height on a surface of water.

The method may include affixing a fixed steering rudder to the base of a waterfowl decoy, and affixing the decoy via a towline to the shell.

BRIEF DESCRIPTION OF THE DRAWINGS

FIG. 7 is an elevated front perspective view of the duck retriever push grille of FIG. 6.

DETAILED DESCRIPTION OF THE PREFERRED EMBODIMENTS

Figure 1A:
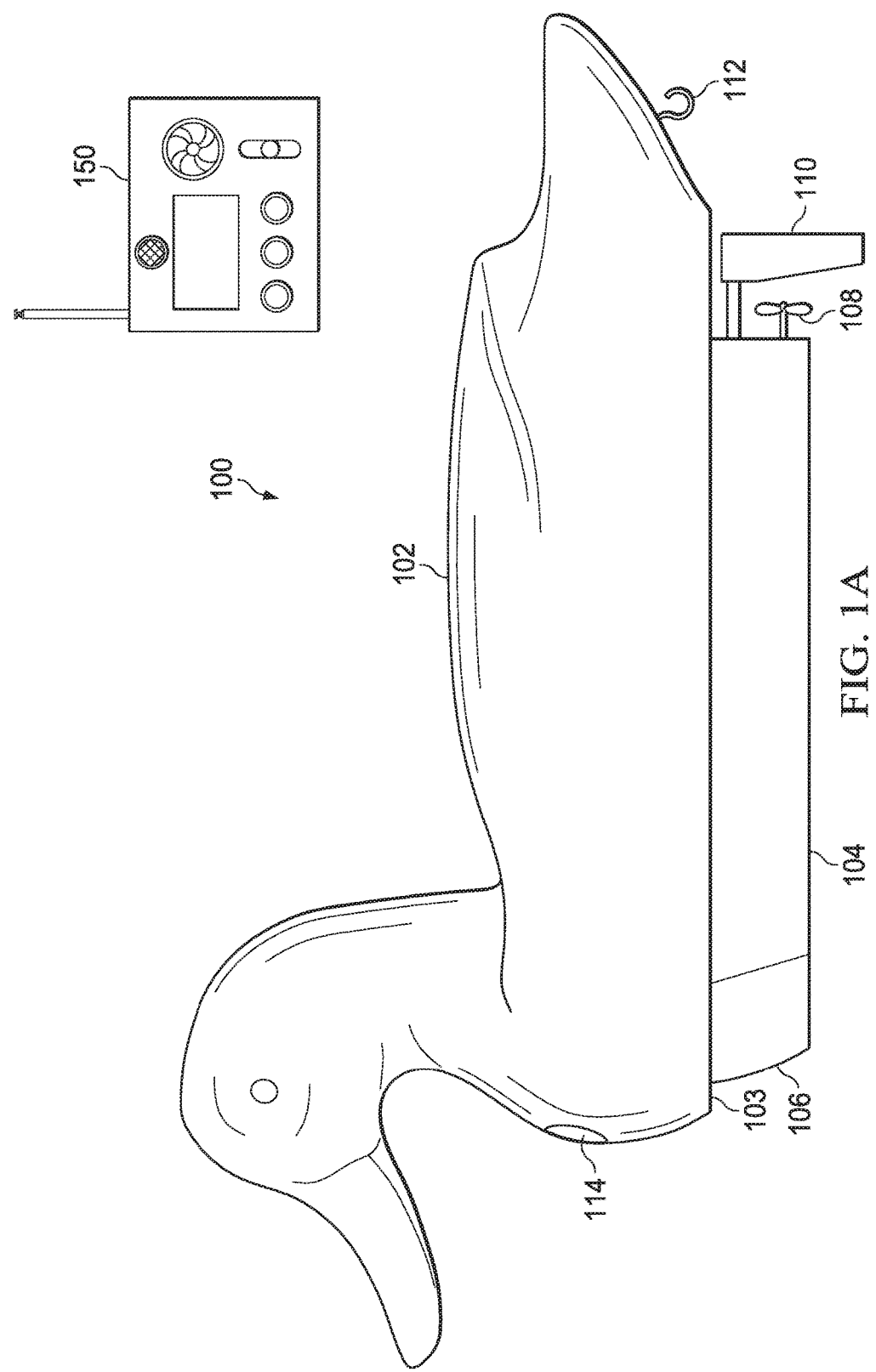
FIG. 1A is a duck decoy with remote control according to aspects of the present disclosure.

Referring now to FIG. 1A, a duck decoy with remote control according to aspects of the present disclosure is shown. The decoy 100 may comprise a shell 102 resembling a duck or other water fowl. The shell 102 may be molded and colored and/or painted to be highly realistic and attractive to particular species of ducks and other water fowl. Below a lower surface 103 of the shell 102 is a boat-like hull 104. The hull 104 resides at or below the water line when the decoy 100 is operational. The hull 104 is not normally visible when the decoy 100 is placed in the water.

The decoy 100, in various embodiments, is self-powered and remote controlled. The decoy 100 may be operated via a wireless remote control 150. The remote 150 control may communicate with a transceiver (260, FIG. 3) within the shell 102 and/or hull 104. The remote control 150 may be configured to selectively provide remote commands to the decoy 100 that include a chosen speed in forward or reverse, as well as turning directions. The term "selectively" is taken here to mean that the user may select the operation such that it is on part of the time and off part of the time, at the user's choosing or discretion.

It is possible to construct decoys that are controlled in the megahertz frequency range (e.g., 72 Mhz). However, these are susceptible to interference and the useful range of such systems can be overly limiting for use in an outdoor hunting environment. On the other hand, the devices of the present disclosure, in some embodiments, are operable in the gigahertz band (e.g., 2.4 Ghz). Such devices may consume less power and may employ spread spectrum, frequency hopping technologies, and other advanced technologies. Useful range, control abilities, and run time may thereby be improved.

In some embodiments, the remote control 150 may provide for setting a speed of a propeller 108 that may be partially or completely in line behind the hull 104. Having the propeller 108 behind the hull 104, rather than protruding below the hull 104, allows for the decoy 100 to be operated in relatively shallow waters and to be somewhat resistant to tangling in weeds or other debris. An operational rudder 110 may be controlled by one or more servos within the body 102 and/or hull 104. By controlling the orientation of the rudder 110, the direction of travel of the decoy 100 may be controlled. It will be appreciated that, since the rudder 110 is also substantially behind the hull 104, the rudder will likewise be operable in shallow waters and be resistant to becoming tangled in weeds or other debris.

The remote control 150 may be able to provide commands for the propeller 108 to move the decoy 100 forward or in a reverse direction. In some embodiments, the remote control 150 is operable to select a preset speed for the decoy 100 and such that the decoy 100 operates in a cruise control fashion. The remote control 150 may also be used to provide for a preset direction on the rudder 110 (e.g., other than straight forward). In this way, the decoy 100 may be provided with a certain degree of autonomy. For example, a user may set the decoy to traverse slowly in a circle of a given radius.

It will be appreciated that the lower surface 103 of the shell 102 will sit at or below the water line. The hull 104, although it is somewhat boat-shaped, provides a blunted end 106. The blunted end 106 ensures that the decoy 100 provides a realistic wake when traveling across the surface of the water. Although efficiencies in battery life can be gained by providing a pointed end to the hull 104, this would result in a smaller or different wake than that produced by a live duck or other waterfowl. Hence, some degree of speed and/or efficiency may be sacrificed in order to appear more realistic to a duck or other water fowl.

As will be described in more detail below, the decoy 100 may provide a tow hook or eyelet 112 such that a single powered decoy can tow a number of other unpowered decoys and thereby enhance the utility of the decoy 100. The decoy 100, having an on board power supply, transceiver, and other electronic controls, can be adapted with a remote control camera 114 that may be attached to provide observation through the shell 102 (e.g., with a waterproof window and/or grommet). The video (optionally including sound) or still images may be broadcast in real time back to the user, possibly to a video screen and/or the video or still images may be recorded for later retrieval.

Figure 1B:
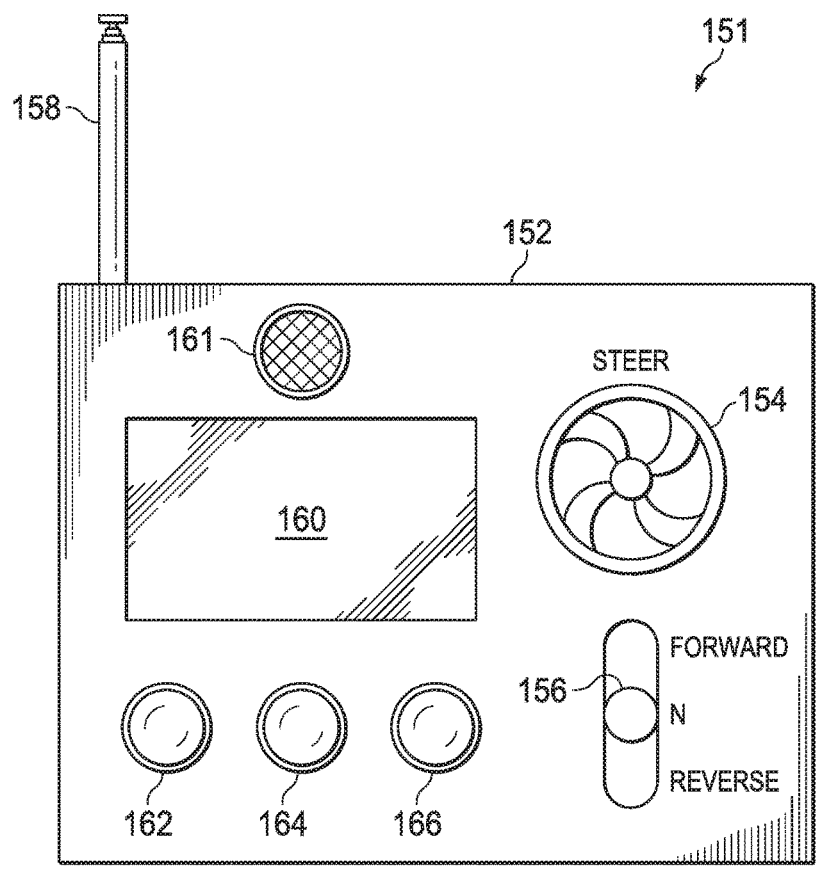
FIG. 1B is a plan view of an enhanced remote control for use with the duck decoy of FIG. 1A.

Referring now to FIG. 1B, a plan view of an enhanced remote control for use with the duck decoy of FIG. 1A is shown. The remote may be similar to the remote 150 of FIG. 1A in that it provides wireless communication for a user of the decoy system 100. The remote 151 may be based on a housing 152 that may be plastic or another material. The remote 151 provides a steering wheel 154 or other steering device allowing control of the rudder 110 for changing directions. A speed slider 156 or other speed control may control whether the propeller 108 operates in a forward or reverse direction. In the present embodiment, the power or speed applied to the propeller 108 may also be adjusted via the slider 156.

The remote 151 also provides further enhanced features. For example, an antenna 158 may be collapsible. A view screen 160 may be provided for displaying images or video captured by camera 114 (either recorded or in real time). An optional speaker 161 may relay audio captured by the decoy system 100. A headphone jack or Bluetooth® transmitter could be employed instead of, or in addition to, the speaker 161. Additional buttons 162, 164, 166 may be utilized to control the additional functionality of the system 100. For example, button 162 may activate the view screen 160, while button 164 activates audio. A button 166 may be utilized to activate a cruise control setting where the decoy 100 traverses in a slow circle to allow hands-free operation. It should be understood that switches or other control mechanisms could be used in place of buttons 162, 164, 166. The functionality provided by these controls is also not necessarily limited to the examples given and more or fewer controls could be used. For example, a separate button or control could be used to activate a right hand traversal versus a left hand traversal. In another embodiment, control may be partially provided by a touchscreen (not shown) that replicates the necessarily switchgear and other buttons to provide full control of the decoy system 100.

Figure 1C:
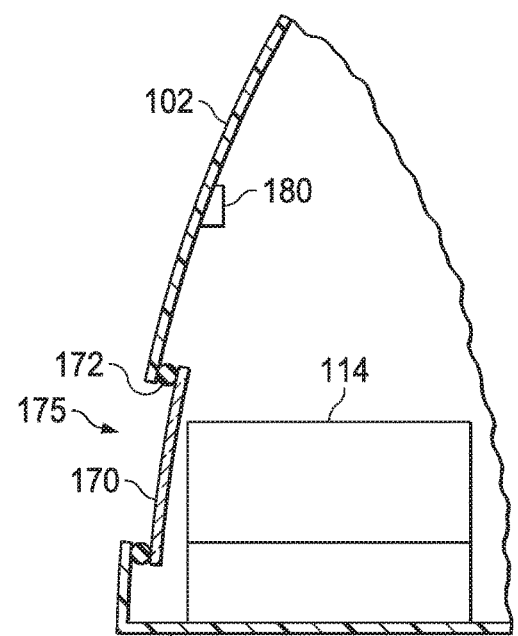
FIG. 1C is a partial side cutaway view of the duck decoy of FIG. 1A.

Referring now to FIG. 1C, a partial side cutaway view of the duck decoy 100 of FIG. 1A is shown. Here one possible placement for the camera 114 is shown. The camera 114 may be pointed toward or affixed to a hole or aperture 175 defined in a frontward portion of the shell 102. A washer or seal 172 may provide a waterproof seal with a window 170. In another embodiment, the camera 114 is affixed directly to the shell 102 via the seal 172. A microphone 180 may be affixed to the shell 102 as shown or elsewhere. In other embodiments, a microphone is integrated with the shell and is sensitive enough to record environmental sounds from within the shell 102.

Figure 2A:
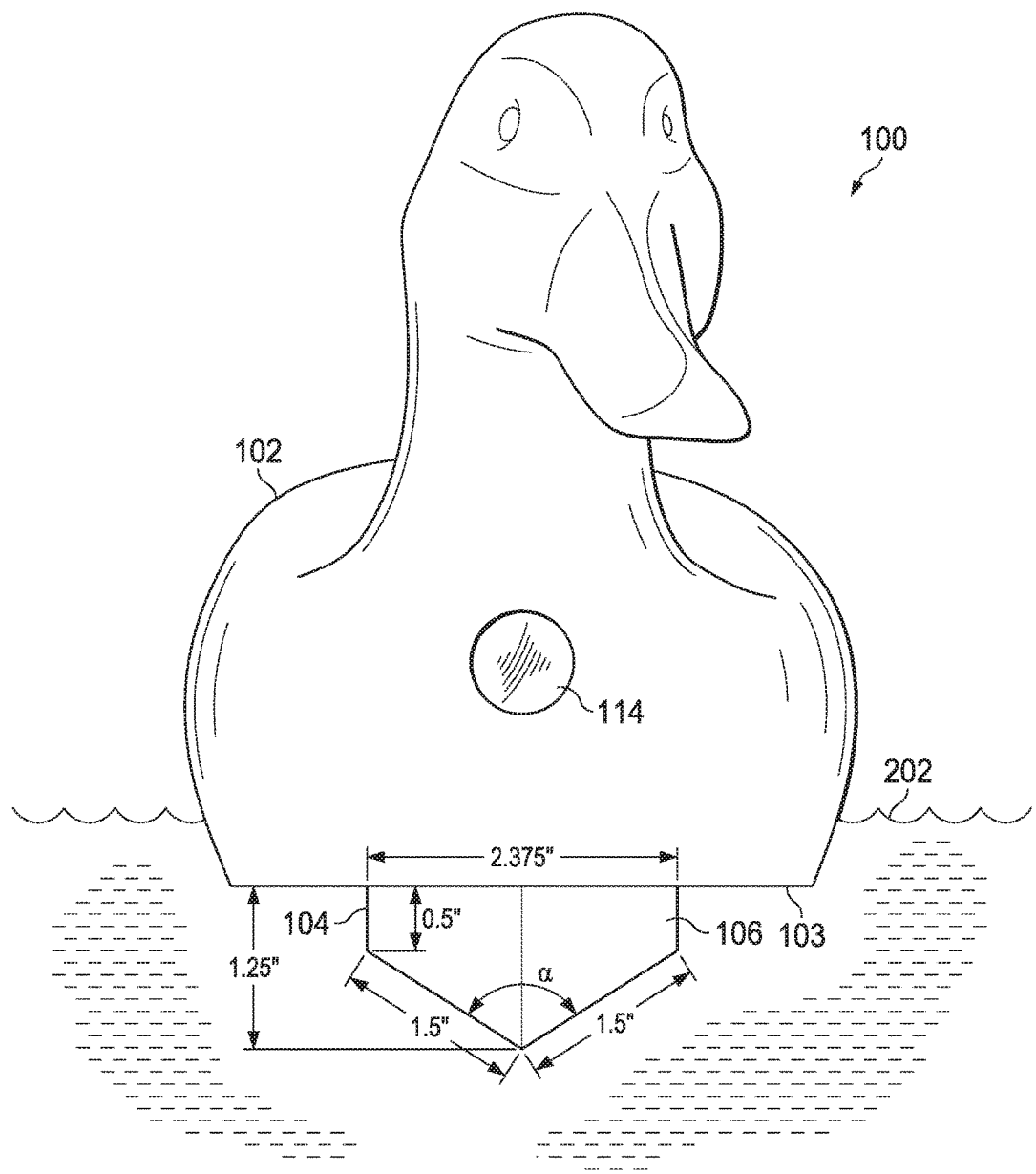
FIG. 2A is a front end view of the decoy of FIG. 1.
Figure 2B:
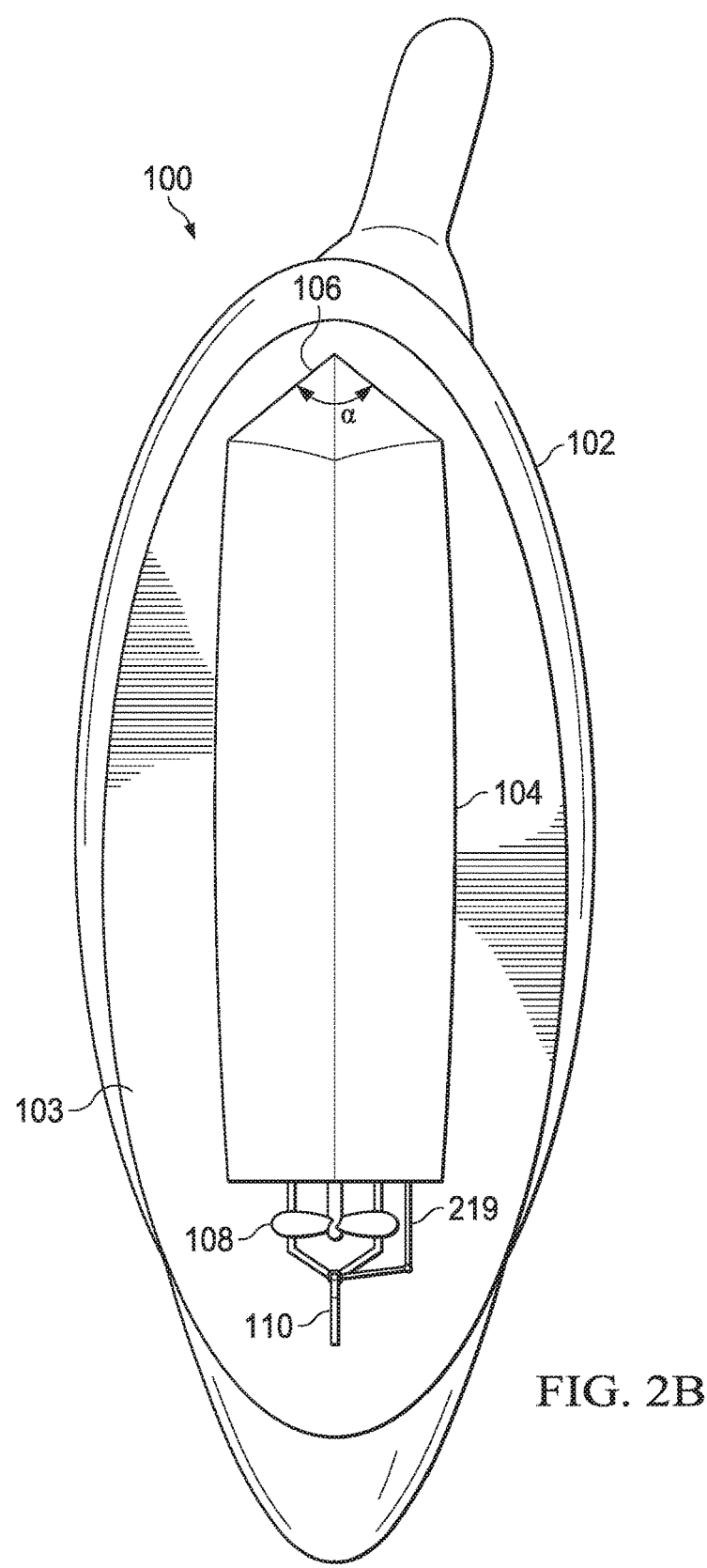
FIG. 2B is an interior view of the decoy of FIG. 1.

Referring now to FIG. 2A, a front end view of the decoy 100 of FIG. 1A is shown. Here, the location of the camera 114 on the front of the shell 102 can be seen. It can also be seen that the lower surface 103 of the shell 102 may be substantially flat and does not necessarily need to continue below a waterline 202 in order to have a realistic appearance or create a realistic wake. The hull 104 may be narrower than the shell 102, as shown, and the shell 102 may overhang the hull 104 in every direction as can be appreciated from FIG. 2B in particular.

The blunted end 106 of the hull 104 may be completely flat but it may also have a shallow-v configuration allowing more room inside the hull 104 for components, and also for improving behavior and performance of the decoy 100 in the water. The angle α made by the bottom of the hull 104 at the blunted end 106 may be about 105°. The hull 104 and/or blunted end 106 may rise from the lower portion of the hull at the angle shown for about 1.5" and then continue straight up to the lower surface 103 of the shell 102 for about 0.5". The further depth of the blunted end 106 from the lower surface 103 of the shell 102 may be about 1.25" while the total width of the blunted end 106 may be about 2.375". These measurements provide a frontal surface area that must be pushed through the water to create a realistic wake of about 2 square inches.

Referring now to Figure, 2B an inferior view of the decoy of FIG. 1 is shown. Here it can be seen that the lower surface 103 of the shell 102 may overhang the hull 104 in every dimension. The propeller 108 and rudder 110 (with necessary hinge and linkages and control rod 219) can be seen to the rear of the hull 104, but below the shell 102 and its bottom surface 103. The blunted end 106 can be seen to also have a shallow-v when viewed from below. Here the angle of the "v" is the same angle α from the frontal view, or about 105°. The angle in the front and bottom views is not necessarily the same for all embodiments. Further, an angle may be present viewed from the front but not below (or vice versa). However, it has been found that by utilizing the example dimensions and angles disclosed herein, that a realistic wake is created when the decoy is driven through the water, yet battery life and performance are maintained at an acceptable level (e.g., the blunted end 106 as disclosed herein, does not unacceptably diminish battery life relative to a more sharply pointed or angled front).

The blunted end 106 of the hull 104 also produces a better, more realistic wake, when it is located relatively far forward with respect to the shell 102. It may be located several inches behind the forward portion of the shell, but then the water displaced by the blunted end 106 does not spread from the front of the decoy 100 as would be the case with a live duck or other animal. The blunted end 106 may therefore be placed, at least at its forward apex, as close at 0.25 inches or less from the edge of the bottom surface 103.

Figure 3:
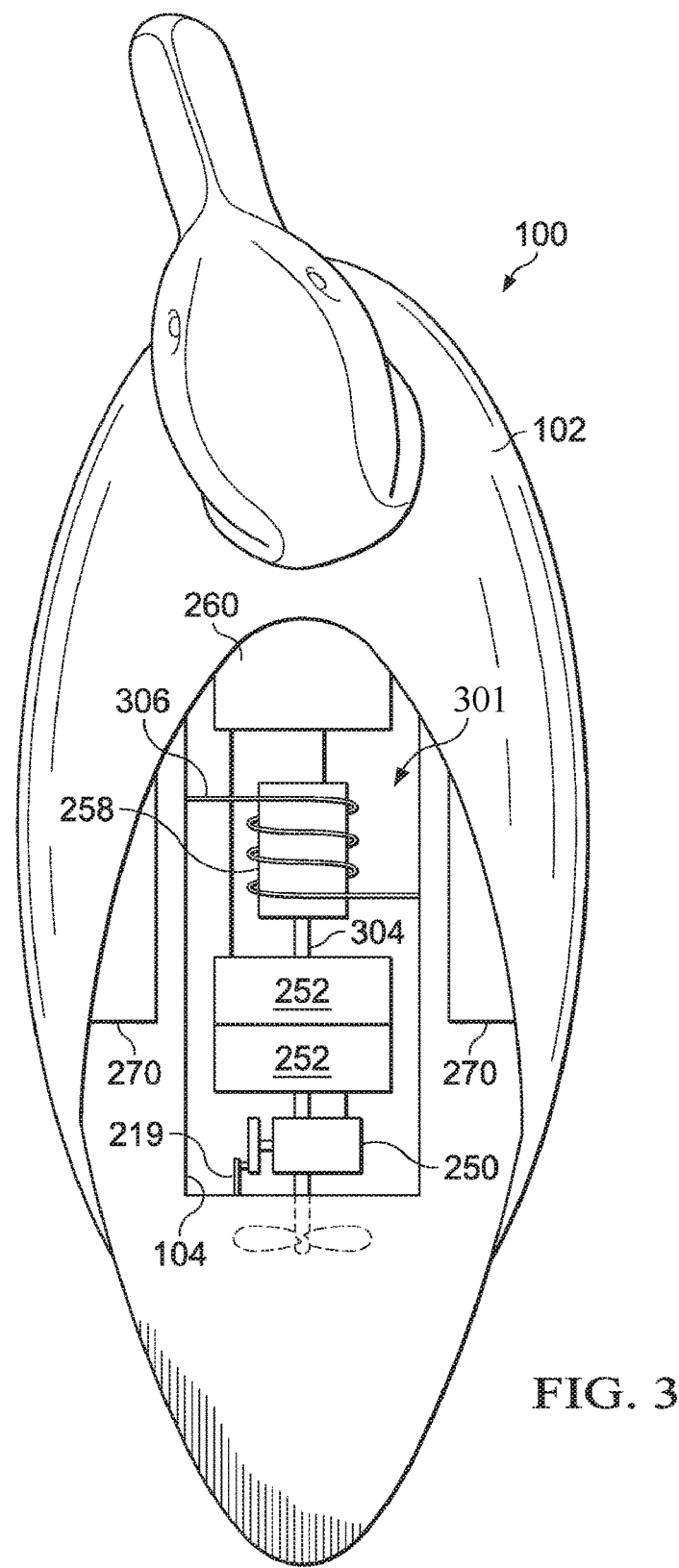
FIG. 3 is a top down view of the decoy of FIG. 1 with access panel removed.

Referring now to FIG. 3, a top down view of the decoy 100 of FIG. 1 with an access panel removed is shown. The hull 104 may be partially or completely open on top and the shell 102 may be partially or completely hollow. Thus, the shell 102 opening into the hull 104 (and vice versa) create a contiguous hollow interior space 301 which contains the control and power devices of the decoy system 100 (apart from the propeller 108 and rudder 110 shown in FIG. 1A, which are necessarily external to the hollow interior 301 in order to operate). In some embodiments, the shell 102 and hull 104 may be formed as an integrated piece. In other embodiments, they are formed separately and joined together by some means (e.g., adhesives) that is at least substantially waterproof.

By removing an access panel from a portion of the shell 102, the hollow interior 301 of the shell 102 and the decoy 100 may be accessed. An exemplary arrangement of a servo mechanism 250 for controlling the rudder 110 is shown. The servo mechanism 250 may be a commercially available servo that provides linear or rotational actuation via one or more internal stepper motors. Via pulse width modulation (PWM) or other control signals the servo mechanism 250 may use a series of linkages, rods, and/or hinge points to move and maintain the rudder 110 in the appropriate position for left or right turns, or straight ahead movement.

Also within the interior 301 are two high capacity battery packs 252. In one embodiment, two separate rechargeable battery packs are provided. In one embodiment, these are rated at 500 milliamp hours each but the present disclosure is not limited to this. Various battery chemistries may be employed including, but not limited to, nickel metal, lithium ion, and cadmium.

A motor 258 powers the propeller via a shaft 304 passing through the hull 104 and underneath the battery packs 252 and the servo mechanism 250. In some embodiments, the motor 258 is water cooled. Water circulation lines 306 may be provided for circulation of water around the motor 252. Water may be feed through the circulations lines 306 via ports (not shown) in the hull 104.

A controlling transceiver 260 may be electrically connected to the battery packs 252, to the servo 250, and to the motor 258 such that the controlling transceiver 260 can provide appropriate control commands as received from the remote control 150. In one embodiment, the controlling transceiver 260 provides all wireless reception and transmission as well as control functionality for the decoy 100. The controlling mechanism 260 may be a solid state device incorporating various silicon chips, amplifiers, antennae and other necessary components. The controlling transceiver 260 may be operationally connected to the camera 114 and/or one or more microphones.

Also shown in the viewpoint of FIG. 3 are two optional weights 270. Depending upon the construction of the shell 102 and the weight of the internal components, additional weights 270 may or may not be needed in order to ensure that the decoy 100 rides at an appropriate height. The weights 270 may be lead or another dense and/or and affordable metal.

Figure 4:
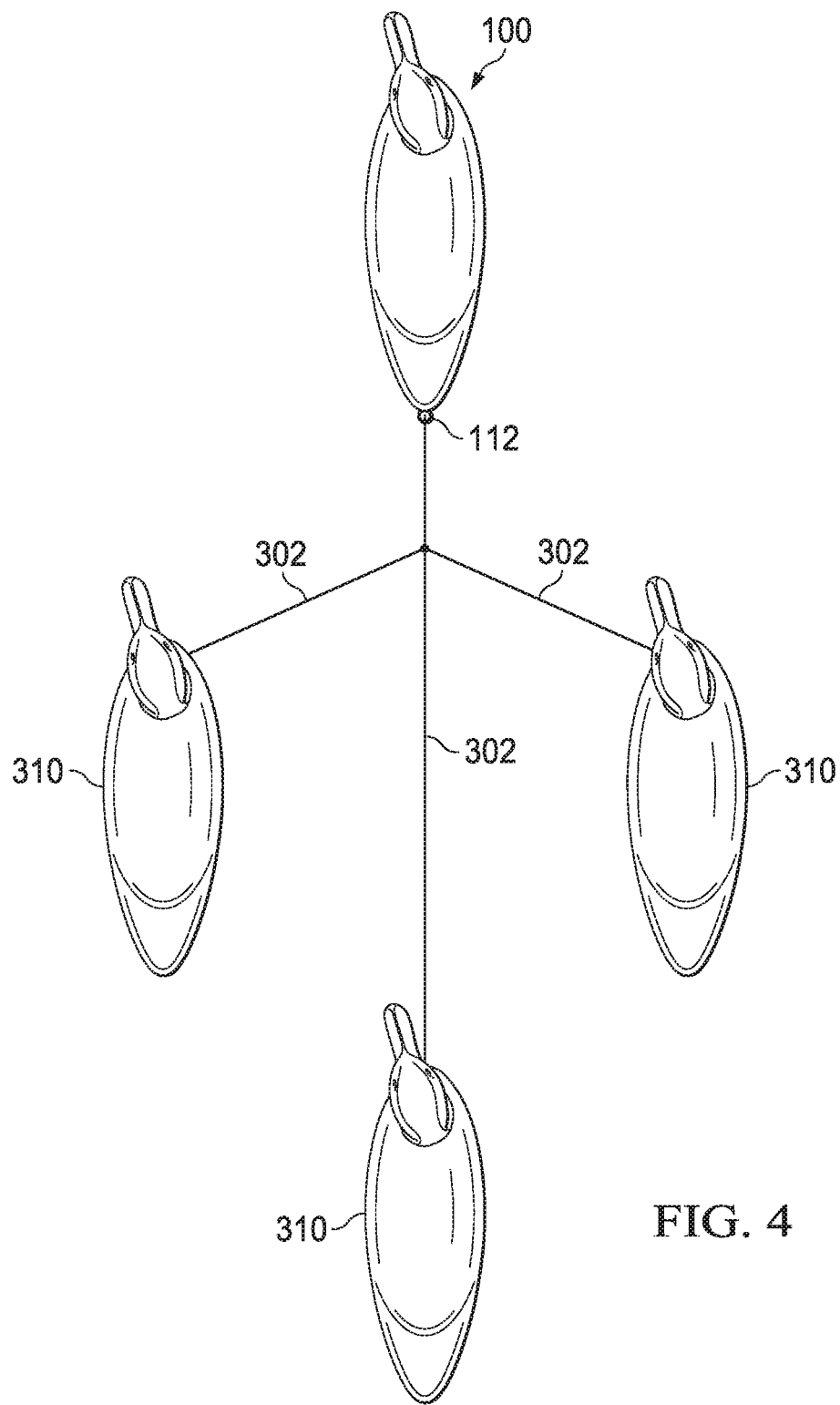
FIG. 4 is a top down view of a powered decoy towing system according to aspects of the present disclosure.
Figure 5A:
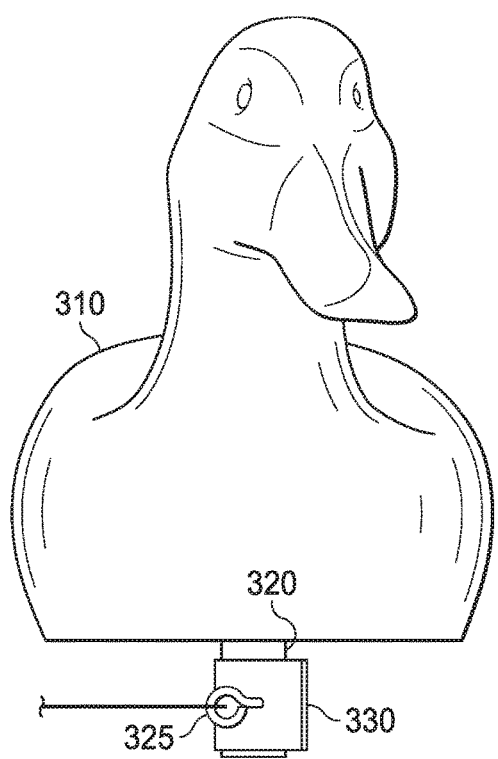
FIG. 5A is a frontal view of a towed decoy according to aspects of the present disclosure.
Figure 5B:
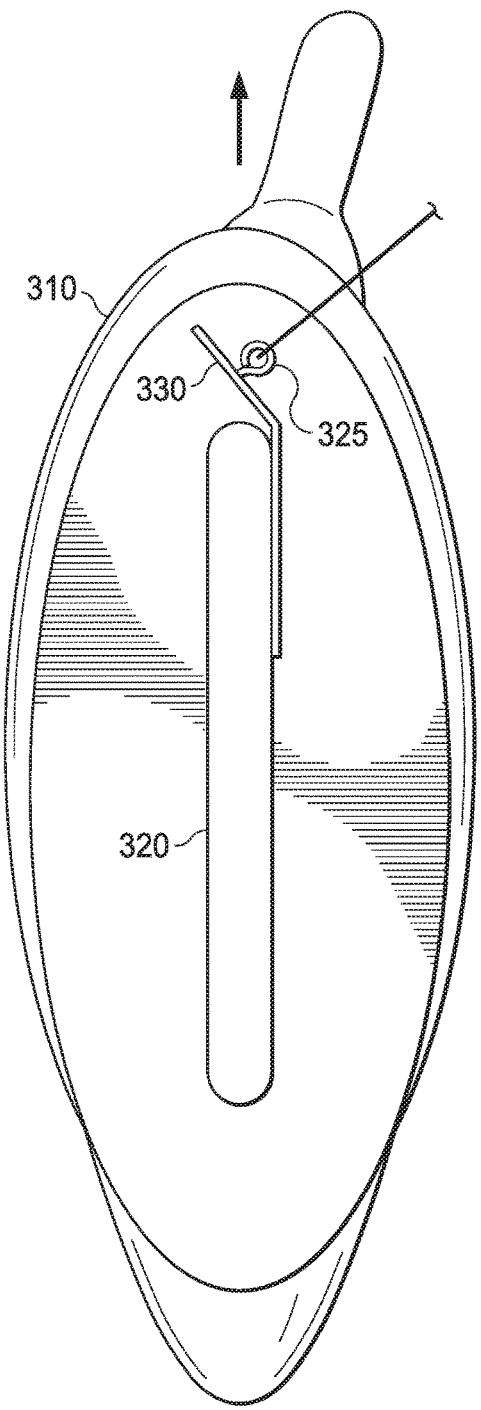
FIG. 5B is a bottom view of the decoy of FIG. 5A.

Referring now to FIG. 4, a top down view of a powered decoy towing system according to the present disclosure is shown. Here, a decoy 100 as previously described can be seen to be towing a number of additional decoys 310 via one or more towlines 302. FIG. 5A is a frontal view of a towed decoy 310 according to aspects of the present disclosure. FIG. 5B is a bottom view of the decoy 310. The general shape of the portion of the decoy 310 that is above the water may be somewhat similar to that of the decoy 100. However, the towed decoys 310 do not generally have internal electronics or control mechanisms, although they may be weighted in order to ride realistically in the water.

In addition to having a weighted keel 320, the decoy 310 has an offset forward facing fixed rudder 330 connected to the keel 320 on the associated shell. The front portion of the keel 320 has an offset rudder 330 angled directionally relative to the intended direction of the towed or pulled decoy 310. The rudder 330 may also provide an eyelet 325 that affixes to the towline 302. It will be appreciated that even a straight forward pull on the eyelet 325 will result in the decoy 310 tending to pull in whatever direction the rudder 320 is angled toward. As shown in FIG. 4, each towed decoy may tow offset to the towing decoy 100 at different distances due to the length of the towline 302. These tendencies can also be controlled by altering the size and angle of the rudder 330. Thus, a single powered decoy 100 can provide the realistic and controllable appearance of an entire flock of ducks or water fowl on the surface of the water.

Figure 6:
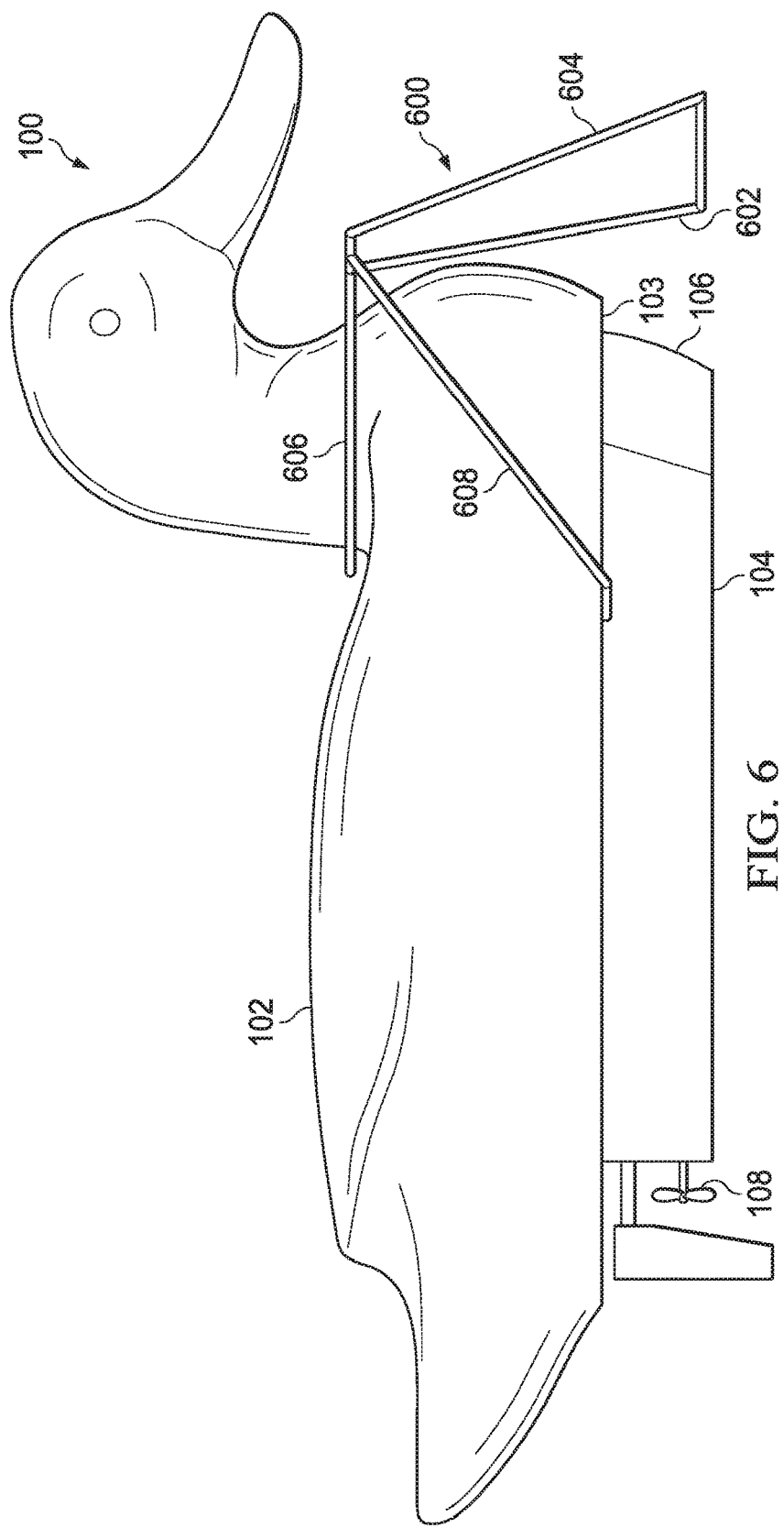
FIG. 6 is a side view of a remote controlled duck decoy with a duck retriever push grille installed according to aspects of the present disclosure.

Referring now to FIG. 6 a side view of a remote controlled duck decoy 100 with an installed duck retriever push grille 600 according to aspects of the present disclosure. The push grille 600 provides a way to utilize the decoy 100 to retrieve game from ponds, lakes, or other bodies of water. Using a decoy that resembles game or wildlife is less disturbing to other wildlife in the area than using a boat or a trained canine. The grille 600 comprises a grate section 602 with side guards 604 that may be somewhat wrapped forward around the grate section 602. This may aid in preventing a bird or other harvested game from slipping off the sides of the push grille 600 when moving through the water. The grate section 602 and sideguards 604 may be sized and mounted to the decoy 100 so as to ride somewhat below the water's surface in order to capture partially submerged birds.

The push grille 600 may mount to the decoy 100 via a neck loop 606 attached to a top of the grate section 602 that may be slid over the head and neck of the decoy 100 and rest on the shell 102. Side braces 608 may wrap rearwardly and downwardly around the shell 102 and go below the lower surface 103 of the shell 102. The side braces 608 may or may not contact the hull 104. The side braces may be flexible to allow them to be expanded when the push grille 600 is installed or removed.

FIG. 7 is an elevated front perspective view of the push grille 600 of FIG. 6. Here the pusher is shown removed from the decoy 100 for clarity. The grate section 602 may comprise a plurality of upright members 614. The number of upright members 614 may vary. As long as enough upright members 614 are provided that game may be reliably retrieved, use of individual spaced apart members 614 allows for ease in pushing through the water and conserves battery power. The upright members 614 may be bound on top by an upper cross member 610 and on bottom by a lower cross member 612. The upper and lower cross members may be wrapped forward, at least on the ends thereof. On the ends of the cross members 610, 612 are side guards 608, which may be similar to the uprights 614 in size. In one embodiment, upright members 614 are equidistantly spaced along the cross member 610, 612 between the side guards 604.

Both the neck loop 606 and the side guards 604 may attach to the upper cross member 608. In some embodiments, the loop 606 and the side guards 604 are provided with at least some flexibility for ease of installation and removal. The duck retriever push grille 600 may be made from wire, all or part of which may have some degree of flexibility in order to resist damage and be easier to install and remove. Once installed, the combination of the neck loop 606 and side 608 braces grasping and wrapping around the shell 102 of the decoy 100 provide enough stability to push downed birds or other game through the water. Under pressure, the grate section 602 may also bear against or be pushed directly by the shell 102 with the neck loop and/or side braces 608 providing lateral and elevational stability.

* * *

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A remote control decoy comprising:
   a hollow shell having a shape and appearance, when viewed above a waterline, of a waterfowl;
   a hull with an open top and a blunted front end affixed to an underside of the hollow shell such that the hull rides below the waterline when the shell is placed on a water surface and the hollow shell and hull form a contiguous hollow interior;
   an electric motor affixed to a shaft passing from inside the hollow interior to a propeller outside the hollow interior and situated rearward of the hull and below the hollow shell;
   a servo inside the hollow interior and affixed via a control rod to a steering rudder situated rearward of the hull and below the hollow shell;
   a battery pack inside the hollow interior and coupled to the electric motor and servo to provide power;
   a transceiver configured to receive radio control signals and activate the electric motor and servo for providing movement and steering of the decoy; and
   a pusher grille mounted to the shell and having a grate section extending downwardly into the water surface
   wherein:
   the grate section of the pusher comprises a plurality of upright members fixed between an upper cross member and a lower cross member;
   a neck loop extends rearwardly from the upper cross member to encircle a neck portion of the shell; and
   a pair of side braces extend from the upper cross member rearwardly and downwardly astride the shell toward the hull.

2. The remote control decoy of claim 1, further comprising a remote control selectively providing radio control signals to the transceiver.

3. The remote control decoy of claim 2, wherein the radio control signals include at least signals to the transceiver to activate or stop the motor and steer the rudder left and right.

4. The remote control decoy of claim 1, further comprising at least one metallic weight affixed to the hollow shell inside the hollow interior to decrease a height at which the decoy rides on water to create a more realistic wake when the decoy moves.

5. The remote control decoy of claim 1, further comprising an eyelet affixed at a rear of the hollow shell for towing additional unpowered decoys.

6. The remote control decoy of claim 1, further comprising a camera inside the hollow interior pointed through a portal on a front portion of the hollow shell.

7. The remote control decoy of claim 1, wherein the camera transmits images to a remote viewing device.

8. A remote controlled decoy comprising:
   a hollow shell having a shape and appearance, when viewed above a waterline of a water surface, of a waterfowl;
   a hull affixed to an underside of the hollow shell such that the hull rides below the waterline when the shell is placed on the water surface and the hollow shell and hull form a contiguous hollow interior;
   an electric motor affixed to a shaft passing from inside the hollow interior to a propeller outside the hollow interior and situated rearward of the hull and below the hollow shell;
   a servo inside the hollow interior and affixed via a control rod to a steering rudder situated rearward of the hull and below the hollow shell;
   a battery pack inside the hollow interior and coupled to the electric motor and servo to provide power;

a transceiver configured to receive radio control signals and activate the electric motor and servo for providing movement and steering of the decoy;

a pusher grille mounted to the shell and having a grate section extending downwardly into the water surface;

wherein the pusher grille has a neck loop extending rearwardly to encircle a neck portion of the shell, and a pair of side braces extending rearwardly and downwardly astride the shell toward the hull.

* * * * *